United States Patent
Nakamura et al.

(10) Patent No.: US 6,853,536 B2
(45) Date of Patent: *Feb. 8, 2005

(54) DIELECTRIC CERAMIC, METHOD OF PRODUCING THE SAME, AND MONOLITHIC CERAMIC CAPACITOR

(75) Inventors: Tomoyuki Nakamura, Omihachiman (JP); Hiroyasu Konaka, Kusatsu (JP); Akira Kata, Omihachiman (JP); Kazuo Muto, Takatsuki (JP); Harunobu Sano, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/739,088

(22) Filed: Dec. 19, 2003

(65) Prior Publication Data

US 2004/0145856 A1 Jul. 29, 2004

(30) Foreign Application Priority Data

Jan. 24, 2003 (JP) .................................... 2003-015646

(51) Int. Cl.$^7$ ................................................ H01G 4/06

(52) U.S. Cl. ................................. 361/321.4; 361/321.1; 361/301.2; 361/321.5; 361/311; 361/313

(58) Field of Search ............................. 361/321.1, 321.4, 361/321.5, 306.1, 306.3, 311, 313, 321.2, 320, 301.2, 312; 501/137, 138, 139

(56) References Cited

U.S. PATENT DOCUMENTS 6,522,521 B2 * 2/2003 Mizuno et al. .......... 361/321.4
2003/0012727 A1 * 1/2003 Yoshikawa et al. ......... 423/598

FOREIGN PATENT DOCUMENTS

| JP | 05-009066 | 1/1993 |
| JP | 06-005460 | 1/1994 |
| JP | 09-270366 | 10/1997 |
| JP | 11-302071 | 11/1999 |
| JP | 2000-058377 | 2/2000 |
| JP | 2001-220224 | 8/2001 |
| JP | 2001-230149 | 8/2001 |
| JP | 2001-313225 | 11/2001 |

* cited by examiner

Primary Examiner—Dean A. Reichard
Assistant Examiner—Nguyen T. Ha
(74) Attorney, Agent, or Firm—Dickstein, Shapiro, Morin & Oshinsky, LLP.

(57) ABSTRACT

A dielectric ceramic includes, in composition, a perovskite-type compound having the general formula $ABO_3$ containing Ba, Ca and Ti, and an additive component containing Si, R(La or the like), and M (Mn or the like), the additive component not being solid-dissolved and, moreover, the major component existing in at least 90% of the cross-section of each of the crystal grains of which the number is equal to at least 85% of that of all of the crystal grains contained in the dielectric ceramic, at least the Ba, the Ca, the Ti, the Si, the R, and the M being contained at at least 85% of the analytical points in the crystal grain boundaries of the dielectric ceramic.

20 Claims, 2 Drawing Sheets

DIELECTRIC CERAMIC, METHOD OF PRODUCING THE SAME, AND MONOLITHIC CERAMIC CAPACITOR

BACKGROUND OF THE INVENTION

1. Field of the Invention

The present invention relates to a dielectric ceramic, a method of procuring the same, and a monolithic ceramic capacitor containing the dielectric ceramic and, particularly, to the improved reduction of the thickness of a dielectric ceramic layer contained in the monolithic ceramic capacitor which can be advantageously carried out.

2. Description of the Related Art

In general, monolithic ceramic capacitors are produced as follows.

First, a ceramic green sheet is prepared. The green sheet contains a dielectric ceramic raw material and has an electroconductive material for an internal electrode applied to the surface of the green sheet in a desired pattern. For example, a dielectric ceramic containing $BaTiO_3$ as a major component is used.

Subsequently, plural ceramic green sheets each having the electroconductive material applied thereon are laminated and hot-press-bonded. Thus, an integrated green laminate is prepared.

Next, the integrated green laminate is fired. Thus, a sintered laminate is produced. The laminate is provided with the internal electrodes formed inside the laminate, which are made from the above-described electroconductive material.

Then, an external electrode is formed on the outer surface of the laminate so as to be electrically connected to a specified internal electrode. In particular, the external electrode is formed, e.g., by applying electroconductive paste containing electroconductive metal powder and glass frit to the outer surface of the laminate, and firing.

Thus, a monolithic ceramic capacitor is produced.

Referring to the electroconductive material to form the internal electrode, base metals such as nickel, copper, or the like, which are relatively inexpensive, have been used in many cases in recent years. However, to produce a monolithic ceramic capacitor containing an internal electrode made of a base metal, firing in a neutral or reducing atmosphere is required to prevent the base metal from being oxidized during firing. Therefore, the dielectric ceramic contained in the monolithic ceramic capacitor must have a reduction-proof property.

As a dielectric ceramic which has the above-described resistance to reduction and can form a monolithic ceramic capacitor of which the capacitance—temperature characteristic meets the requirement of Characteristic B of JIS standard, a material containing $BaTiO_3$ as a major component, and oxides of rare earth elements, oxides of Mn, Fe, Ni, Cu or the like, a sintering-assisting agent, and so forth are used as additives.

Referring to the above-described dielectric ceramic, for example, Japanese Unexamined Patent Application Publication No. 5-9066 (Patent Document 1), Japanese Unexamined Patent Application Publication No. 9-270366 (Patent Document 2), Japanese Unexamined Patent Application Publication No. 11-302071 (Patent Document 3), and Japanese Unexamined Patent Application Publication No. 2000-58377 (Patent Document 4) propose the compositions of dielectric ceramics which have a high dielectric constant, a lower temperature-dependent change of a dielectric constant, and a long high-temperature load service life, respectively.

Referring to the structure of the dielectric ceramic, Japanese Unexamined Patent Application Publication No. 6-5460 (Patent Document 5), Japanese Unexamined Patent Application Publication No. 2001-220224 (Patent Document 6), and Japanese Unexamined Patent Application Publication No. 2001-230149 (Patent Document 7) propose dielectric ceramics having a so-called core-shell structure.

Moreover, Japanese Unexamined Patent Application Publication No. 2001-313225 (Patent Document 8) proposes a dielectric ceramic having a so-called core-shell structure in which the core is partially exposed from the shell.

Recently, electronics have been remarkably developed, and simultaneously, the sizes of electronic parts have been rapidly decreased. Moreover, monolithic ceramic capacitors have experienced a trend toward reduction of the size and increase of the capacitance. As regards effective means for realizing small-sizes and large capacitances in monolithic ceramic capacitors, the thickness of a dielectric ceramic layer is reduced, for example. In general, the thicknesses of dielectric ceramic layers contained in such commercially available products are up to about 2 $\mu$m. The thicknesses of dielectric ceramics investigated in laboratories are up to about 1 $\mu$m. Enhancement of the dielectric constants of dielectric ceramics is important for realizing small-sizes and large capacitances of the dielectric ceramics.

Moreover, an electrical circuit must be operated with high stability, irrespective of variations in temperature. For this purpose, capacitors used in the electrical circuit must be stable against the variation of temperature.

As seen in the above-description, the advent of monolithic ceramic capacitors, of which the temperature-dependent change of the capacity is small, the electrical insulating property is high and the reliability is superior, even if the thickness of a dielectric ceramic layer is reduced, is earnestly desired.

The dielectric ceramic described in Patent Document 1 meets the characteristic X7R specified in EIA Standard, and moreover, exhibits a high electrical insulating property. However, when the thickness of a dielectric ceramic layer is reduced, and specifically in the case in which the thickness is less than 5 $\mu$m, especially less than 3 $\mu$m, the capacitance-temperature characteristic and the reliability of the dielectric ceramic do not sufficiently meet the demands in the market.

Similarly, the dielectric ceramics described in Patent Documents 2, 3, and 4, are such that the smaller the thickness of a dielectric ceramic layer is to be, e.g., less than 2 $\mu$m, the more the capacitance-temperature characteristics and the reliabilities are deteriorated.

Moreover, each of the so-called core-shell type dielectric ceramics described in Patent Documents 5, 6, and 7 comprises a core portion having a ferroelectric property and a shell portion having a paraelectric property. This dielectric ceramic has a superior capacitance—temperature characteristic. However, the shell portion has a low dielectric constant. Thus, the dielectric constant of the whole dielectric ceramic is reduced, due to the existence of the shell portion. The reason is that when plural dielectrics exist in a ceramic, the dielectric constant of the overall dielectric ceramic is substantially equal to a value calculated by addition of the logarithms of the dielectric constants according to the so-called logarithmic mixing rule. Moreover, problems occur in that with the thickness of a dielectric ceramic layer being reduced, the capacitance—temperature characteristic is deteriorated, and also, the reliability is reduced.

For to the dielectric ceramic having a structure described in Patent Document 8, control of construction is carried out using the firing temperature. Therefore, the electrical characteristics of the dielectric ceramic tend to be dispersed. Thus, problems occur in that for a dielectric ceramic layer of which the thickness is reduced, the capacitance—temperature characteristic and the reliability can not be ensured.

As seen in the above-description, if the thickness of a dielectric ceramic layer is reduced so that the size of a monolithic ceramic capacitor can be reduced, the capacitance thereof is increased, and also, the level of an AC signal is maintained at the same value as that before the reduction of the thickness, the electric field strength applied per dielectric ceramic layer is increased, and thus, the capacitance—temperature characteristic is remarkably deteriorated. Moreover, if the thickness of a dielectric ceramic layer is decreased and the DC rated voltage is set at the same value as that before the reduction of the thickness, the electric field strength applied per dielectric ceramic layer is increased, and thus, the reliability is remarkably deteriorated.

Accordingly, the advent of a dielectric ceramic which has a high dielectric constant is desired, which can be used to form a dielectric ceramic layer of which the temperature-dependent dielectric constant is not deteriorated, even if the thickness of the layer is reduced, and which can provide a monolithic ceramic capacitor with a high reliability.

SUMMARY OF THE INVENTION

It is an object of the present invention to provide a dielectric ceramic, a method of producing the dielectric ceramic which can satisfy the above-described requirements, and a monolithic ceramic capacitor formed using the dielectric ceramic.

According to the present invention, there is provided a dielectric ceramic which includes, in composition, a perovskite-type compound having the general formula $ABO_3$ in which A represents Ba and Ca, or Ba, Ca and Sr, and B represents Ti or Ti and at least one of Zr and Hf which is substituted for a part of the Ti, and an additive component containing Si, R and M, in which R represents at least one of La, Ce, Pr, Nd, Sm, Eu, Gd, Tb, Dy, Ho, Er, Tm, Yb, Lu and Y, and M represents Mn, Ni, Co, Fe, Cr, Cu, Mg, Al, V, Mo and W, the dielectric ceramic having crystal grains and crystal grain boundaries between the crystal grains, the additive component not being solid-dissolved and, moreover, the major component existing in at least about 90% of the cross-section of each of the crystal grains of at least about 85% of all of the crystal grains, and at least the Ba, Ca, Ti, Si, R and M being at at least about 85% of the analytical points in the crystal grain boundaries. Even if the thickness of a dielectric ceramic layer formed of the dielectric ceramic is reduced, the dielectric ceramic layer has a high reliability. Also, the capacitance—temperature characteristic is superior and the dielectric constant is high. Accordingly, a monolithic ceramic capacitor having a high reliability and a superior capacitance—temperature characteristic can be realized by forming the dielectric ceramic layers of a monolithic ceramic capacitor by using the dielectric ceramic. In addition, the size of the monolithic ceramic capacitor can be reduced, and the capacitance thereof is increased, due to the reduction of the thickness of the dielectric ceramic layer.

It is to be noted that whether the additive component is solid-dissolved in at least 90% of the cross-section of a particular crystal grain or not is determined based on the TEM analysis with a detection lower limit of 0.5%.

In this patent specification, the expression "crystal grain boundary" means an area defined by two crystal grains and also, an area defined by at least three crystal grains(the so-called triple point). More specifically, if a distinct layer is crystallographically observed between crystal grains in the cross-section of a ceramic, the layer is defined as a crystal grain boundary. On the other hand, if no layer is crystallographically observed between crystal grains in the cross-section of a ceramic, and crystal grains are joined with each other, an area extended over a width of 2 nm on both of the sides of the joining line as a center line, including the joining point, is defined as a crystal grain boundary.

Preferably, the formula $Ca_g/Ti_g < Ca_b/Ti_b$ is established in the dielectric ceramic of the present invention, in which $Ca_g$ is the amount of Ca, and $Ti_g$ is the amount of Ti contained in the crystal grains, and $Ca_b$ is the amount of Ca, and $Ti_b$ is the amount of Ti contained in the crystal grain boundaries. Thereby, the reliability can be more enhanced.

Also, preferably, the concentration of Ca in the crystal grains is in the range of about 1 to 20 molar percent based on the amount of the element A contained in the, major component $ABO_3$. Thereby, the dielectric ceramic has a high dielectric constant.

Preferably, the concentrations on an element basis of the R and the M in the additive component are in the ranges of about 0.05 to 1.5 moles and about 0.1 to 2 moles, respectively, based on 100 moles of the major component. Thereby, the dielectric constant, the capacitance—temperature characteristic, and the reliability can be further enhanced.

Moreover, there is provided according to the present invention a method of producing a dielectric ceramic which includes the steps of: synthesizing a perovskite-type compound having the general formula $ABO_3$ in which A represents Ba and Ca, or Ba, Ca and Sr, and B represents Ti or Ti and at least one of Zr and Hf which is substituted for a part of the Ti, the perovskite-type compound having a crystallographic axial ratio c/a of at least about 1.009; calcining compounds containing at least Ba, Ca, Ti, Si, R and M, in which R is at least one of La, Ce, Pr, Nd, Sm, Eu, Gd, Tb, Dy, Ho, Er, Tm, Yb, Lu and Y, and M represents at least one of Mn, Ni, Co, Fe, Cr, Cu, Mg, Al, V, Mo and W to produce a calcined material; and firing a compounded material, as a raw material for the dielectric ceramic, containing a mixture of the perovskite-type compound and the calcined material. Thus, the above-described dielectric ceramic can be produced easily and securely.

Since the crystallographic axial ratio c/a is at least about 1.009, the synthesis degree is sufficiently high. Thus, the major component of the perovskite-type compound and the additive component can be inhibited from reacting with each other. Thus, the dielectric ceramic of the present invention can be produced.

Preferably, the mole ratio Ca/Ti of the perovskite-type compound obtained in the step of synthesizing the perovskite-type compound is smaller than the mole ratio Ca/Ti in the calcined material obtained in the step of producing the calcined material. Thereby, the above-described formula $Ca_g/Ti_g < Ca_b/Ti_b$ can be established, in which $Ca_g$ is the amount of Ca, and $Ti_g$ is the amount of Ti contained in the crystal grains, and $Ca_b$ is the amount of Ca, and $Ti_b$ is the amount of Ti contained in the crystal grain boundaries.

Moreover, there is provided a monolithic ceramic capacitor according to the present invention which includes: a laminate which contains plural laminated dielectric ceramic layers and plural internal electrodes extended along particular interfaces between the plural dielectric ceramic layers and overlapping each other in the lamination direction; and external electrodes formed on the outer surface of the laminate so as to be electrically connected to predetermined ones of the internal electrodes; the dielectric ceramic layers being made of the above-described dielectric ceramic.

The dielectric ceramic of the present invention can be fired in a reducing atmosphere. In the case in which the monolithic ceramic capacitor is formed using the dielectric ceramic, a base metal can be advantageously used as an internal electrode material. Moreover, in the case in which the dielectric ceramic layers and the external electrodes are simultaneously fired, a base metal can be advantageously used as an external electrode material.

DESCRIPTION OF THE PREFERRED EMBODIMENTS

Figure 1:
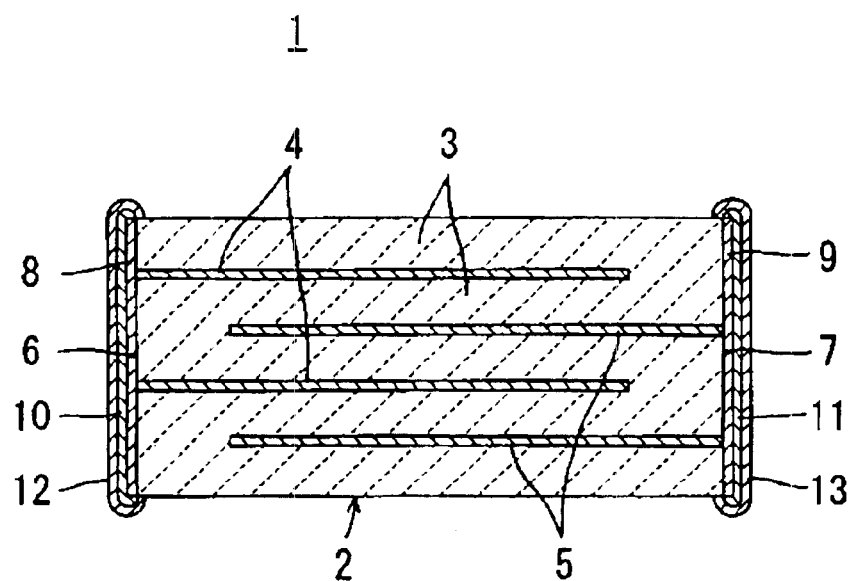
FIG. 1 is a cross-sectional view illustrating a monolithic ceramic capacitor 1 according to an embodiment of the present invention.

FIG. 1 is a cross-sectional view illustrating a monolithic ceramic capacitor 1 according to an embodiment of the present invention.

The monolithic ceramic capacitor 1 contains a laminate 2. The laminate 2 comprises plural dielectric ceramic layers 3 laminated to each other, and plural internal electrodes 4 and 5 formed at the interfaces between the plural dielectric ceramic layers 3, respectively. The internal electrodes 4 and 5 are formed so as to reach the outer surfaces of the laminate 2. The internal electrodes 4 extended to one 6 of the end faces of the laminate 2 and the internal electrodes 5 extended to the other end face 7 are alternately arranged inside the laminate 2.

External electrodes 8 and 9 are formed by applying an electroconductive paste to the end-faces 6 and 7 of the surface of the laminate 2, and baking the paste. First plating layer 10 and 11 are formed on the external electrodes 8 and 9, and then, second plating layers 12 and 13 are formed thereon, if necessary.

In the monolithic ceramic capacitor 1, the plural internal electrodes 4 and 5 are formed so as to overlap each other in the lamination direction of the laminate 2. Thereby, electrostatic capacitances are generated between neighboring internal electrodes 4 and 5. Moreover, the internal electrodes 4 are electrically connected to the external electrodes 8, and the internal electrodes 5 are electrically connected to the external electrodes 9, respectively. Thereby, the above-described static capacitances are drawn via the external electrodes 8 and 9.

The dielectric ceramic layer 3 is formed of the following dielectric ceramic according to the present invention to be in composition, a perovskite-type compound having the general formula $ABO_3$, as a major component, in which A represents Ba and Ca, or Ba, Ca, and Sr, and B represents Ti, or Ti and at least one of Zr and Hf which is substituted for a part of the Ti, and an additive component containing Si, R and M, in which R represents at least one of La, Ce, Pr, Nd, Sm, Eu, Gd, Tb, Dy, Ho, Er, Tm, Yb, Lu and Y, and M represents Mn, Ni, Co, Fe, Cr, Cu, Mg, Al, V, Mo and W, the dielectric ceramic having crystal grains and crystal grain boundaries between the crystal grains, the additive component not being solid-dissolved and, moreover, the major component existing in at least about 90% of the cross-section of each of the crystal grains of at least about 85% by number are of all of the crystal grains, is such that at least the Ba, Ca, Ti, Si, R, and M are contained at at least about 85% of the analytical points in the crystal grain boundaries.

If the dielectric ceramic does not meet the above-described requirements, inconveniently, the dielectric constant of the dielectric ceramic is low, the capacitance—temperature characteristic is deteriorated and the high temperature load service life becomes short.

Preferably, the formula $Ca_g/Ti_g < Ca_b/Ti_b$ is established in the dielectric ceramic, in which $Ca_g$ is the amount of Ca, and $Ti_g$ is the amount of Ti contained in the crystal grains, and $Ca_b$ is the amount of Ca, and $Ti_b$ is the amount of Ti contained in the crystal grain boundaries.

By satisfying the above-described requirement, the high temperature load service life is further prolonged, and the reliability can be further enhanced.

Preferably, the concentration of Ca in the crystal grains in the dielectric ceramic is in the range of about 1 to 20 molar percent based on the amount of the element A contained in the major component $ABO_3$. Thereby, the dielectric constant can be further increased.

Preferably, the concentrations on an element basis of the R and the M in the additive component in the dielectric ceramic are in the ranges of about 0.05 to 1.5 moles and about 0.1 to 2 moles, based on 100 moles of the major component, respectively. Thereby, the dielectric constant is further increased, the capacitance—temperature characteristic is further enhanced and the high temperature load service life is prolonged.

Hereinafter, a method of producing the dielectric ceramic or the monolithic ceramic capacitor shown in FIG. 1 will be described.

First, a powder raw material for the dielectric ceramic to form the dielectric ceramic layer is prepared. Preferably, the powdery raw material is produced as follows.

As the A of the general formula $ABO_3$, Ba and Ca, or Ba, Ca, and Sr is selected, and as the B, Ti, or Ti and at least one of Zr and Hf which is substituted for a part of the Ti is selected. Moreover, the contents of the A and the B are selected. Thus, the perovskite-type compound $ABO_3$ is synthesized. In this case, it is important that the perovskite-type compound has a crystallographic axial ratio c/a of at least 1.0090. That is, it is important to enhance the synthetic degree or the crystallinity.

On the other hand, compounds containing at least Ba, Ca, Ti, Si, R and M, in which R is at least one of La, Ce, Pr, Nd, Sm, Eu, Gd, Tb, Dy, Ho, Er, Tm, Yb, Lu and Y, and M represents at least one of Mn, Ni, Co, Fe, Cr, Cu, Mg, Al, V, Mo and W are calcined to produce a calcined material.

Subsequently, the perovskite-type compound and the calcined material are mixed with each other. The obtained compounded material is used as the powdery raw material.

Since the powdery raw material is produced as described above, the dielectric ceramic satisfying the above-described requirement can be easily produced. Moreover, the dielectric ceramic satisfying the above-described requirement also can be produced by adjustment of the firing conditions, in addition to using the above-described process of producing the powdery raw material.

The Ca/Ti mole ratio of the perovskite-type compound is set to be smaller than the mole ratio Ca/Ti in the calcined material. Thereby, the dielectric ceramic having the formula $Ca_g/Ti_g < Ca_b/Ti_b$, in which $Ca_g$ is the amount of Ca, and $Ti_g$ is the amount of Ti contained in the crystal grains, and $Ca_b$ is the amount of Ca, and $Ti_b$ is the amount of Ti contained in the crystal grain boundaries, as described above, can be produced.

Moreover, the amount of Ca in the perovskite-type compound and the average grain size can be adjusted by controlling the synthesis conditions for the perovskite-type compound.

Then, an organic binder and a solvent are added to and mixed with the powdery raw material for the dielectric ceramic produced as described above, to form slurry. A ceramic green sheet, which is to be a dielectric ceramic layer 3, is formed by use of the slurry.

Thereafter, electroconductive paste films, which are to be internal electrodes 4 and 5, are formed on particular ceramic green sheets by screen-printing. The electroconductive paste films contain a base metal such as nickel, a nickel alloy, copper or a copper alloy as an electroconductive component. The internal electrodes 4 and 5 may be formed, e.g., by evaporation, plating, or the like, not only by the screen-printing.

Thereafter, plural ceramic green sheets each having an electroconductive paste film formed thereon as described above are laminated to each other. Then, ceramic green sheets each having no electroconductive paste film formed thereon are laminated in such a manner that the above-described ceramic green sheets are sandwiched between them. These ceramic green sheets are press-bonded, and are cut, if necessary. Thus, a green laminate, which is to be a laminate 2, is produced. The ends of the electroconductive paste films are exposed onto the end-faces of the green laminate.

Subsequently, the green laminate is fired in a reducing atmosphere. Thereby, the laminate 2 after the sintering, as shown in FIG. 1, is obtained. In the laminate 2, the ceramic green sheets form dielectric ceramic layers 3, and the electroconductive paste films form the internal electrodes 4 and 5.

External electrodes 8 and 9 are formed on the end-faces 6 and 7 of the laminate 2 so as to be electrically connected to the exposed ends of the internal electrodes 4 and 5, respectively.

Materials for the external electrodes 8 and 9 may be the same as those for the internal electrodes 4 and 5. Silver, palladium, silver-palladium alloys or the like, may be used. Glass frits of $B_2O_3$—$SiO_2$—BaO type glass, $B_2O_3$—$Li_2O$—$SiO_2$—BaO type glass or the like may be added to the powders of the above-described metals. Appropriate materials are selected considering uses of the monolithic ceramic capacitor and the places it will be used.

For formation of the external electrodes 8 and 9, ordinarily, a paste containing the above described metal powders is applied to the outer surface of the fired laminate 2 and is baked. The paste may be applied to the outer surface of the green laminate before the firing, and is simultaneously fired and baked with the green laminate to provide the laminate 2.

Thereafter, the external electrodes 8 and 9 are plated with nickel, copper or the like. Thus, first plating layers 10 and 11 are formed. Then, the first plating layers 10 and 11 are plated with solder, tin or the like. Thus, second plating layers 12 and 13 are formed. The formation of the plating layers 10 to 13 on the external electrodes 8 and 9 may be omitted, depending on the intended uses of the monolithic ceramic capacitor 1.

As described above, the monolithic ceramic capacitor 1 is produced.

There is a possibility that Al, Sr, Zr, Fe, Hf, Na, Co, W, Mo, Mn or the like is present as impurities in the process of preparing a powdery raw material for the dielectric ceramic, and in other production processes. These impurities have a possibility of existing inside the crystal grains and at crystal grain boundaries. However, the presence of these impurities does not become a problem with the electrical characteristics of the monolithic ceramic capacitor.

Preferably, nickel or copper is used as a material for the internal electrodes 4 and 5. In this case, components contained in the internal electrodes 4 and 5 have a possibility of being diffused to be in the crystal grains or in the crystal grain boundaries of the dielectric ceramic during the firing process for production of the monolithic ceramic capacitor 1. This is not a problem with the electrical characteristics of the monolithic ceramic capacitor 1.

Hereinafter, experimental examples will be described, which were carried out to identify the advantages of the present invention.

EXPERIMENTAL EXAMPLES

Experimental Example 1

In Experimental Example 1, $(Ba_{0.95}Ca_{0.05})TiO_3$ was used as major component having the general formula $ABO_3$, which contains Ba, Ca and Ti. As additive components, $BaCO_3$, $CaCO_3$, $TiO_2$, $SiO_2$, $Dy_2O_3$ and NiO were used, as shown in Table 1. Sample 1 as an embodiment of the present invention, and Samples 2-1 and 2-2 as comparative examples were evaluated.

1. Preparation of Powdery Dielectric Ceramic Raw Material (1) Sample 1

First, $BaCO_3$, $CaCO_3$, and $TiO_2$ were prepared as starting materials for the major component $ABO_3$, and weighed out so that the composition of $(Ba_{0.95}Ca_{0.05})TiO_3$ could be produced. Subsequently, the raw materials were mixed for 72 hours with a ball mill and heat-treated at 1150° C. Thus, $(Ba_{0.95}Ca_{0.05})TiO_3$ was produced. The synthetic degree of this major component of $ABO_3$ was evaluated based on the crystallographic axial ratio c/a of a tetragonal system. The axial ratio c/a was very high, i.e., 1.0101, as shown in Table 1. The average grain size was 0.3 μm.

On the other hand, $BaCO_3$, $CaCO_3$, $TiO_2$, $SiO_2$, $Dy_2O_3$ and NiO were weighed out to produce the additive component so that the respective molar ratio would be 1.05:0.1:1:1:0.05:0.2. Subsequently, these materials were mixed with a ball mill and heat-treated at 1100° C. Thus, a calcined material was obtained. The reaction made in the calcined material was identified by XRD (X-ray diffractometry). The average grain size of the calcined material was 0.1 μm.

Next, as shown in Table 1, $(Ba_{0.95}Ca_{0.05})TiO_3$ and the calcined material of Ba—Ca—Ti—Si—Dy—Ni—O were weighed out so that the amounts of Ba, Ca, Ti, Si, Dy and Ni were 1.05 moles, 0.1 mole, 1 mole, 1 mole, 0.1 mole, and 0.2 mole based on 100 moles of $(Ba_{0.95}Ca_{0.05})TiO_3$, respectively. Then, these materials were mixed with a ball mill. Thus, a powdery raw material for the dielectric ceramic of Sample 1 was produced.

(2) Sample 2-1

$(Ba_{0.95}Ca_{0.05})TiO_3$ as a major component $ABO_3$ was produced in the same manner as that for Sample 1.

To produce the additive component, $BaCO_3$, $CaCO_3$, $TiO_2$, $SiO_2$, $Dy_2O_3$ and NiO were weighed out so that the same composition as that of Sample 1 would be obtained. Subsequently, these materials, not calcined, were mixed with the above-described $(Ba_{0.95}Ca_{0.05})TiO_3$ by means of a ball mill. Thus, a powdery raw material for the dielectric ceramic of Sample 2-1 was produced.

(3) Sample 2-2

$(Ba_{0.95}Ca_{0.05})TiO_3$ as a major component $ABO_3$ was produced in the same manner as that for Sample 1 except that the time during which the $BaCO_3$, $CaCO_3$ and $TiO_2$ were mixed by means of the ball mill was 5 hours, that is, the time was shorter compared to that for Sample 1. The synthetic degree of this major component $ABO_3$ was evaluated based on the crystallographic axial ratio c/a. As shown in Table 1, the ratio was low, i.e., 1.0084.

Subsequently, the calcined material as the additive component was produced in the same manner as that for Sample 1. $(Ba_{0.95}Ca_{0.05})TiO_3$ and the calcined material of Ba—Ca—Ti—Si—Dy—Ni—O were mixed with each other by means of a ball mill. Thus, a powdery raw material for the dielectric ceramic of Sample 2-2 was produced.

2. Preparation of Monolithic Ceramic Capacitor

Subsequently, a polyvinylbutyral type binder and an organic solvent such as ethanol were added to each of the powdery raw materials for the dielectric ceramics of Samples 1, 2-1 and 2-2, and were wet-mixed by means of a ball mill. Thus, for each powdery raw material, ceramic slurry was produced.

Next, the ceramic slurry was formed into sheets by a doctor blade method. The thickness of the sheets was such that the thickness of the dielectric ceramic layer after firing was 1.5 μm. Thus, rectangular ceramic green sheets were produced.

Next, an electroconductive paste containing nickel as a major component was screen-printed on the ceramic green sheets. Thus, a conductive paste film to become an internal electrode was formed.

Then, plural ceramic green sheets including the ceramic green sheets having the conductive past films formed thereon were laminated in such a manner that the sides of the ceramic green sheets to which the conductive paste films were exposed were alternately positioned on the opposite sides. Thus, a green laminate was produced.

Subsequently, the green laminate was heated at 300° C. in a nitrogen atmosphere so that the binder was burned out. Thereafter, the laminate was fired at 1200° C. for 2 hours in a reducing atmosphere containing an $H_2$—$N_2$—$H_2O$ gas and having an oxygen partial pressure of $10^{-10}$ MPa. Thus, a sintered laminate was produced.

Next electroconductive paste containing $B_2O_3$—$Li_2O$—$SiO_2$—BaO type glass frit and copper as an electroconductive component was applied to both of the end faces of the laminate, and baked at 800° C. in a nitrogen atmosphere. Thus, external electrodes electrically connected to the internal electrodes were formed.

Referring to the outside sizes of the obtained monolithic ceramic, the width was 1.2 mm, the length was 2.0 mm and the thickness was 1.0 mm. The thickness of the dielectric ceramic layer interposed between the internal electrodes was 1.5 μm. The number of the effective dielectric ceramic layers was 100. The opposed area of the electrodes per layer was 1.4 mm².

3. Analysis of Composition of Dielectric Ceramic

As regards the monolithic ceramic capacitors of Sample 1, and Samples 2-1 and 2-2, the compositions of the dielectric ceramics constituting the dielectric ceramic layers, respectively, were analyzed by a TEM-EDX method (Transmission Electron Microscopy-Energy Dispersive X-ray Analysis).

More specifically, the inside of a crystal grain was plane-composition-analyzed. The areas excluding the crystal grain boundaries were image-analyzed as the insides of crystal grains. Twenty crystal grains were analyzed for determination of the composition.

The crystal grain boundaries (including triple points) were analyzed. In the case in which a crystal grain boundary existed as a definite phase, the phase as the crystal grain boundary was analyzed at a probe diameter of 2 nm. As regards crystal grain boundaries which did not exist as define phases, the analytical points between crystal grains at which the analysis was carried out at a probe diameter of 2 nm were the analytical points in the crystal grain boundary.

The compositions were analyzed at the analytical points in the crystal grain boundary. In this case, the analysis of the composition in the crystal grain boundary between two crystal grains and that in the crystal grain boundary (triple points) among three crystal grains were carried out at 20 randomly selected analytical points and 10 randomly selected analytical points, respectively.

TABLE 1

| Sample number | Major component ABO₃ | Axial ratio c/a of major component ABO₃ | Additive component | | |
|---|---|---|---|---|---|
| | | | Component R | Component M | Others |
| 1 | 100(Ba₀.₉₅Ca₀.₀₅)TiO₃ | 1.0101 | Calcined material 1.05Ba—0.1Ca—1.0Ti—1.0Si—0.1Dy—0.2Ni—O | | |
| *2-1 | 100(Ba₀.₉₅Ca₀.₀₅)TiO₃ | 1.0101 | 0.05Dy₂O₃ | 0.2NiO | 1.05BaCO₃ 0.1CaCO₃ 1.0TiO₂ 1.0SiO₂ |
| *2-2 | 100(Ba₀.₉₅Ca₀.₀₅)TiO₃ | 1.0084 | Calcined material 1.05Ba—0.1Ca—1.0Ti—1.0Si—0.1Dy—0.2Ni—O | | |

TABLE 2

| Sample number | Ratio of number of crystal grains in which occupancy ratio of ABO₃ is 90% or higher | State of other crystal grains | Ratio of Ba, Ca, Ti, Si, Dy, and Ni existing in crystal grain boundary |
|---|---|---|---|
| 1 | 90% | Remaining 10% Occupancy ratio of ABO₃ in crystal grain is 80% | 93% |
| *2-1 | 15% | Remaining 85% Occupancy ratio of ABO₃ in crystal grain is 65% or lower | 33% |

TABLE 2-continued

| Sample number | Ratio of number of crystal grains in which occupancy ratio of $ABO_3$ is 90% or higher | State of other crystal grains | Ratio of Ba, Ca, Ti, Si, Dy, and Ni existing in crystal grain boundary |
|---|---|---|---|
| *2-2 | 20% | Remaining 80% Occupancy ratio of $ABO_3$ in crystal grain is 75% or lower | 47% |

Table 2 shows the composition-analytical results.

In Table 2, the expression "Ratio of number of crystal grains in which occupancy ratio of $ABO_3$ is 90% or higher" means the percentage of the in number of crystal grains in each of which an additive component is not solid-dissolved, and also, the major component $ABO_3$ exists in 90% or higher of the area of the cross-section of the crystal grain. For example, the numerical value of the ratio in Table 2 is 90% in the case of Sample 1. In particular, 18% of the 20 crystal grains analyzed had the additive component not solid-dissolved, and also, the major component $ABO_3$ exists in 90% or higher of the cross-section thereof.

In Table 2, the expression "State of other crystal grains" means the state of the crystal grains which are other than the above-described crystal grains in each of which the occupancy ratio of $ABO_3$ is 90% or higher. For example, the expression "Remaining 10%" in Sample 1, means that the percentage of the number of crystal grains other than the crystal grains having an occupancy ratio of 90% or higher is 10% or higher. The expression "Occupancy ratio of $ABO_3$ in crystal grain is 80%" means that the percentage of the cross-section occupied by $ABO_3$ inside the crystal grain is 80% or higher.

Moreover, the expression "Ratio of Ba, Ca, Ti, Si, Dy, and Ni existing in crystal Grain Boundary" in Table 2 means the ratio of the number of points in crystal grain boundaries at which Ba, Ca, Ti, Si, Dy and Ni can be detected. In Sample 1, for example, Ba, Ca, Ti, Si, Dy and Ni were detected at analytical points equal to 93% of all the analytical points in the crystal grain boundaries.

Figure 2:
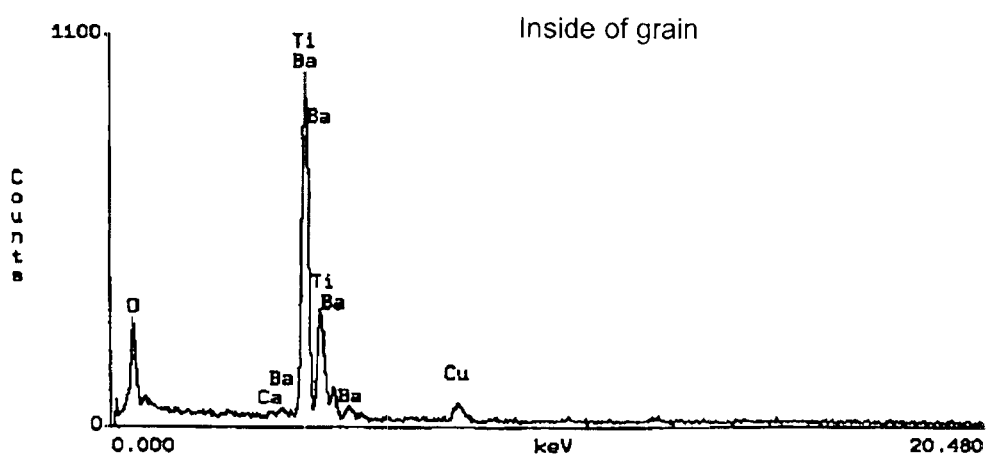
FIG. 2 is a graph showing the analytical results of the composition inside of a crystal grain contained a sample 1 which is an example of the present invention, determined by TEM-EDX.

FIG. 2 shows the analytical results of the composition in crystal grains of Sample 1, which is an embodiment of the present invention, measured by the TEM-EDX method. As seen in FIG. 2, the concentrations of Si, Dy and Ni in Sample 1 were less than the detection lower limit (the detection limit by the TEM analysis is 0.5 molar percent) in at least 90% of the cross-sections of 90% of the number of the crystal grains. Substantially, Ba, Ca and Ti only were detected.

Figure 3:
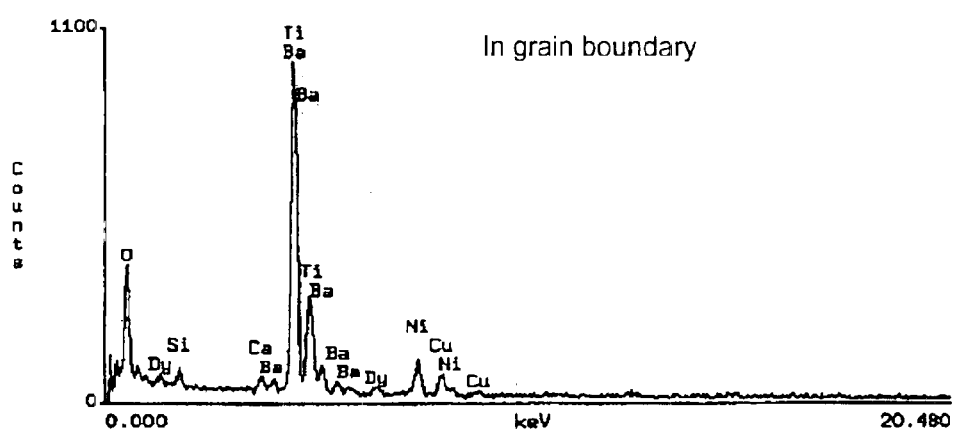
FIG. 3 is a graph showing the analytical results of the composition in a crystal grain boundary of the sample 1 illustrated in FIG. 2, determined by TEM-EDX.

FIG. 3 shows the analytical results of the composition in crystal grain boundaries of Sample 1 measured by the TEM-EDX method. As seen in FIG. 3, Ba, Ca, Ti, Si, Dy and Ni were detected in crystal grain boundaries.

On the other hand, in Samples 2-1 and 2-2, which are comparative examples, each crystal grain contained in the dielectric ceramic has a so-called core-shell structure comprising a shell phase in which Dy and Ni are partially solid-dissolved in $(Ba_{0.95}Ca_{0.05})TiO_3$, and a core phase in which no additive component is solid-dissolved in $(Ba_{0.95}Ca_{0.05})TiO_3$.

4. Measurement of Electrical Characteristics

Moreover, the electrical characteristics of the monolithic ceramic capacitors formed with Sample 1 and Samples 2-1 and 2-2 produced as described above were determined.

The dielectric constant $\epsilon$ and the dielectric loss tangent (tan $\delta$) at room temperature of each monolithic ceramic capacitor were measured under the conditions of a temperature of 25° C., 1 kHz and 0.5 $V_{rms}$.

First, the ratio of the change of the electrostatic capacitance with temperature was determined. Referring to the change ratio of the electrostatic capacitance with temperature, the change ratios ($\Delta C/C_{20}$) at −25° C. and at 85° C. based on the electrostatic capacitance at 20° C. were evaluated. These change ratios are Characteristic B specified in JIS (Japanese Industrial Standard). Moreover, the change ratios ($\Delta C/C_{25}$) at −55° C. and 125° C. based on the static capacitance at 25° C. were evaluated. These change ratios are Characteristic X7R specified in EIA (Electronic Industries Association) Standard.

Moreover, a high temperature load service life test was carried out. According to the high temperature load service life test, a voltage of 15V is applied at a temperature of 125° C. so that the electric field strength becomes 10 kV/mm. The time-dependent change of the insulation resistance is measured during the application of the voltage of 15V. A sample of which the insulation resistance becomes 200 k$\Omega$ before a lapse of 1000 hours is considered to be a rejected sample. The ratio (rejection ratio) of the number of rejected samples based on 100 samples is determined.

TABLE 3

| Sample number | Dielectric constant | tan $\delta$ (%) | Temperature characteristic ($\Delta C/C_{20}$) (%) | | Temperature characteristic ($\Delta C/C_{25}$) (%) | | High temperature load service life (rejection ratio) |
|---|---|---|---|---|---|---|---|
| | | | −25° C. | 85° C. | −55° C. | 125° C. | 1000 hours |
| 1 | 3380 | 7.2 | −4.6 | −8.5 | −7.6 | −11.7 | 0/100 |
| * 2-1 | 2461 | 6.3 | −8.1 | −12.1 | −11.1 | −17.3 | 47/100 |
| * 2-2 | 2352 | 5.4 | −6.9 | −10.7 | −9.8 | −16.2 | 42/100 |

Table 3 shows the measurements of the above-described dielectric constant $\in$, tan $\delta$, the temperature characteristics ($\Delta C/C20$ and $\Delta C/C25$) and the rejection ratios.

As shown in Table 2, the ratio of the number of crystal grains for Sample 1 in each of which the occupancy ratio is about 90% or higher is more than about 85%, and the Ba, Ca, Ti, Si, Dy and Ni existing in crystal grain boundaries is 85% or higher. As seen in Table 3, although the dielectric ceramic layer contained in Sample 1 has a very small thickness of 1.5 $\mu$m, the reliability and the capacitance—temperature characteristic is superior, and the dielectric ceramic has a high dielectric constant.

On the other hand, the dielectric constants are low for Samples 2-1 and 2-2, which do not meet the above-described requirements, and the change ratios of the capacitance—temperature characteristics are high, and the reliabilities are low, compared to those of Sample 1.

Experimental Example 2

In Experimental Example 2, preferred ranges of the amounts of Ca and Ti in dielectric ceramics according to the present invention were determined. The ratio $Ca_g/Ti_g$ and the ratio $Ca_b/Ti_b$ in which $Ca_g$ and $Ti_g$ represent the amounts of Ca and Ti in crystal grains, and $Ca_b$ and $Ti_b$ represent the amounts of Ca and Ti in crystal grain boundaries (including a triple point), can be easily controlled by changing the ratio of the amounts of Ca and Ti, that is, the ratio Ca/Ti, in the major component raw material, and also, by changing the ratio the mounts of Ca and Ti, that is, the ratio Ca/Ti, in the additive component raw material.

Table 4 for Experimental Example 2 corresponds to Table 1 for Experimental Example 1. Table 4 shows the compositions and the crystallographic axial ratios c/a of the major components $ABO_3$ and the compositions of calcined materials formed as the additive components in samples prepared in Experimental Example 2.

The ratio $Ca_b/Ti_b$ is made larger than the ratio $Ca_g/Ti_g$ in Samples 3 to 7 as shown in Table 5, by employing a ratio Ca/Ti of the additive component raw material which is higher than the ratio Ca/Ti of the major component raw material as shown in Table 4. On the other hand, the ratio $Ca_b/Ti_b$ for Samples 8 to 10 is made smaller than the ratio $Ca_g/Ti_g$ as shown in Table 5, by employing the ratio Ca/Ti in the major component raw material which is higher than the ratio Ca/Ti in the additive component raw material.

Samples 3 to 10 show superior electrical characteristics as shown in Table 5. Especially in the 2000 hour high-temperature load service life (rejection ratio), Samples 3 to 7 of which the ratio $Ca_b/Ti_b$ is larger than the ratio $Ca_g/Ti_g$, respectively, exhibit a higher reliability than Samples 8 to 10

TABLE 4

| Sample number | Major component $ABO_3$ | Crystallographic axial ratio c/a of major component $ABO_3$ | Additive component (calcined material) |
|---|---|---|---|
| 3 | $100(Ba_{0.95}Ca_{0.05})TiO_3$ | 1.0102 | 1.1Ba—0.2Ca—1.0Ti—1.4Si—1.0Dy—1.0Mn—0.5Ni—0.5Mg—O |
| 4 | $100(Ba_{0.90}Ca_{0.10})TiO_3$ | 1.0101 | 1.05Ba—0.1Ca—0.8Ti—0.8Si—1.2Er—1.0Mn—O |
| 5 | $100(Ba_{0.90}Ca_{0.10})(Ti_{0.995}Zr_{0.005})O_3$ | 1.0097 | 0.95Ba—0.15Ca—1.0Ti—1.2Si—1.2Er—1.0Co—0.5Cr—O |
| 6 | $100(Ba_{0.97}Ca_{0.03})(Ti_{0.985}Zr_{0.005}Hf_{0.01})O_3$ | 1.0098 | 1.1Ba—0.25Ca—0.8Ti—1.0Si—0.5Y—0.5Ho—0.8Mg—O |
| 7 | $100(Ba_{0.97}Ca_{0.03})(Ti_{0.99}Zr_{0.01})O_3$ | 1.0092 | 1.0Ba—0.05Ca—1.0Ti—1.4Si—0.8Y—0.3Tm—1.0Mg—0.2Fe—O |
| 8 | $100(Ba_{0.95}Ca_{0.05})(Ti_{0.995}Hf_{0.005})O_3$ | 1.0097 | 1.05Ba—0.05Ca—1.5Ti—1.0Si—0.5Sm—0.5Ho—0.8Mn—0.4Fe—O |
| 9 | $100(Ba_{0.90}Ca_{0.08}Sr_{0.02})O_3$ | 1.0098 | 0.95Ba—0.1Ca—2.0Ti—0.8Si—1.2Yb—0.5Cu—0.3Mn—0.2Ni—O |
| 10 | $100(Ba_{0.90}Ca_{0.08}Sr_{0.02})(Ti_{0.99}Zr_{0.01})O_3$ | 1.0090 | 1.1Ba—0.1Ca—1.5Ti—0.5Si—1.0Y—0.4Yb—0.5Mn—0.5Al—O |

Monolithic ceramic capacitors were prepared in a manner similar to that in Experimental Example 1, using the respective samples shown in Table 4. The electrical characteristics were evaluated similarly to those of Experimental Example 1. Table 5 shows the evaluation results of the electrical characteristics. As regards the high temperature load service life test, the test for the 1000 hour service life was carried out similarly to that in Experimental Example 1, and in addition, a 2000 hour test was conducted.

Table 5 also shows the ratio $Ca_g/Ti_g$ in crystal grains contained in the dielectric ceramic constituting a dielectric ceramic layer of the produced monolithic ceramic capacitor and the ratio $Ca_b/Ti_b$ in crystal grain boundaries contained in the dielectric ceramic.

of which the ratio $Ca_b/Ti_b$ is smaller than the ratio $Ca_g/Ti_g$, respectively.

Experimental Example 3

Experimental Example 3 was carried out to evaluate a preferred range of the concentration of Ca in crystal grains contained in the dielectric ceramic.

Table 6 corresponds to Table 1 for Experimental Example 1. Table 6 shows the compositions and the crystallographic axial ratio c/a of the major components $ABO_3$ and the compositions of the calcined materials formed as the additive components in samples prepared in Experimental Example 3.

TABLE 5

| Sample number | Ratio $Ca_g/Ti_g$ | Ratio $Ca_b/Ti_b$ | Dielectric constant | tan δ (%) | Temperature characteristic ($\Delta C/C_{20}$) (%) | | Temperature characteristic ($\Delta C/C_{25}$) (%) | | High temperature load service life (rejection ratio) | |
|---|---|---|---|---|---|---|---|---|---|---|
| | | | | | −25° C. | 85° C. | −55° C. | 125° C. | 1000 hours | 2000 hours |
| 3 | 0.052 | 0.179 | 3275 | 6.3 | −3.0 | −8.0 | −5.2 | −11.0 | 0/100 | 0/100 |
| 4 | 0.099 | 0.121 | 2886 | 8.4 | −2.4 | −7.5 | −4.7 | −10.2 | 0/100 | 0/100 |
| 5 | 0.100 | 0.144 | 2892 | 8.1 | −2.3 | −7.4 | −4.8 | −10.3 | 0/100 | 0/100 |
| 6 | 0.041 | 0.311 | 3420 | 5.1 | −2.1 | −7.8 | −5.7 | −12.2 | 0/100 | 0/100 |
| 7 | 0.029 | 0.052 | 3624 | 5.3 | −3.8 | −9.5 | −6.2 | −14.1 | 0/100 | 0/100 |
| 8 | 0.053 | 0.034 | 3423 | 6.4 | −3.2 | −8.7 | −5.8 | −11.8 | 0/100 | 9/100 |
| 9 | 0.084 | 0.046 | 3108 | 7.9 | −2.9 | −8.3 | −5.5 | −11.7 | 0/100 | 34/100 |
| 10 | 0.090 | 0.068 | 3055 | 7.9 | −2.6 | −8.0 | −5.1 | −11.3 | 0/100 | 16/100 |

TABLE 6

| Sample number | Major component ABO$_3$ | Crystallographic axial ratio c/a of manor component ABO$_3$ | Additive component (calcined material) |
|---|---|---|---|
| *11 | 100BaTiO$_3$ | 1.0099 | 1.1Ba—0.2Ca—1.0Ti—1.4Si—1.0Dy—1.0Mn—0.5Ni—0.5Mg—O |
| 12 | 100(Ba$_{0.99}$Ca$_{0.01}$)TiO$_3$ | 1.0102 | 1.1Ba—0.2Ca—1.0Ti—1.4Si—1.0Dy—1.0Mn—0.5Ni—0.5Mg—O |
| 13 | 100(Ba$_{0.89}$Ca$_{0.10}$Sr$_{0.01}$)TiO$_3$ | 1.0097 | 1.0Ba—0.1Ca—1.2Ti—1.2Si—1.0Dy—1.0Mn—0.5Ni—0.5Mg—O |
| 14 | 100(Ba$_{0.80}$Ca$_{0.20}$)(Ti$_{0.995}$Hf$_{0.005}$)O$_3$ | 1.0095 | 1.0Ba—0.1Ca—1.2Ti—1.2Si—1.0Dy—1.0Mn—0.5Ni—0.5Mg—O |
| 15 | 100(Ba$_{0.79}$Ca$_{0.21}$)TiO$_3$ | 1.0094 | 1.0Ba—0.2Ca—1.0Ti—1.4Si—1.0Dy—1.0Mn—0.5Ni—0.5Mg—O |

As shown in Table 6, powdery dielectric ceramic raw materials were prepared which contained the major components ABO$_3$ in which the amounts of Ca substituted for the sites A in the major components ABO$_3$ were different, that is, the Ca substitution amounts were different. Monolithic ceramic capacitors were prepared in the same manner as that employed in Experimental Example 1. For the produced monolithic ceramic capacitors, the electrical characteristics were evaluated similarly to those in Experimental Example 2. Table 7 shows the evaluation results.

TABLE 7

| Sample number | Dielectric constant | tan δ (%) | Temperature characteristic ($\Delta C/C_{20}$) (%) | | Temperature characteristic ($\Delta C/C_{25}$) (%) | | High temperature load service life (rejection ratio) | |
|---|---|---|---|---|---|---|---|---|
| | | | -25° C. | 85° C. | -55° C. | 125° C. | 1000 hours | 2000 hours |
| * 11 | 2314 | 1 | -9.8 | -2.2 | -16.3 | -20.4 | 0/100 | 0/100 |
| 12 | 3290 | 3.5 | -2.8 | -9.2 | -6.8 | -14.3 | 0/100 | 0/100 |
| 13 | 3208 | 6.6 | -2.4 | -4.3 | -4.2 | -7.2 | 0/100 | 0/100 |
| 14 | 2987 | 8.5 | -0.9 | -3.1 | -2.0 | -2.8 | 0/100 | 0/100 |
| 15 | 2686 | 9.1 | -0.8 | -2.9 | -1.2 | -3.1 | 7/100 | 33/100 |

As shown in Table 6, no Ca is added to the major component ABO$_3$ in Sample 11. As a result, example 11 has a low dielectric constant and an inferior capacitance—temperature characteristic compared to the other Samples 12 to 15 as shown in Table 7.

In the case of Samples 12 to 15, Ca is added to the major components ABO$_3$ thereof, as shown in Table 6. As a result, Samples 12 to 15 show superior electrical characteristics, as shown in Table 7.

Samples 12 to 15 were compared with each other. In Samples 12 to 14, the Ca concentrations of the major component ABO$_3$ are in the range of about 1 to 20 molar percent. In Sample 15, the Ca concentration is 21 molar percent, i.e., exceeds about 20 molar percent. As a result, Samples 12 to 14 of which the Ca concentrations are in the range of about 1 to 20 molar percent exhibit higher dielectric constants and higher reliabilities (rejection ratio) in the high temperature load service life test, compared to Sample 15 of which the Ca concentration departs from the range of 1 to 20 molar percent.

Experimental Example 4

Experimental Example 4 was carried out to evaluate a preferred range of the addition amount based on 100 moles of the major component ABO$_3$ of an additive component raw material R (at least one of La, Ce, Pr, Nd, Sm, Eu, Gd, Tb, Dy, Ho, Er, Tm, Yb, Lu, and Y), and a preferred range of the addition amount on a compound basis, on 100 moles of the major component ABO$_3$ of an additive component raw material M (at least one of Mn, Ni, Cu, Fe, Cr, Cu, Mg, Al, V, Mo and W).

Table 8 corresponds to Table 1 for Experimental Example 1, and shows the compositions and the crystallographic axial ratios c/a of the major components ABO$_3$, and the compositions of the calcined materials formed as the additive components in the samples prepared in Experimental Example 4. Moreover, the concentrations by mole ratio, based on 100 moles of the major component, on an element basis of the above-described components R and M are shown in the lower part of each column of "Additive component (calcined material)".

TABLE 8

| Sample number | Major component ABO$_3$ | Crystallographic axial ratio c/a of major component ABO$_3$ | Additive component (calcined material) | |
|---|---|---|---|---|
| | | | Component R (mole) | Component M (mole) |
| *19 | 100(Ba$_{0.90}$Ca$_{0.10}$)TiO$_3$ | 1.0098 | 0.95Ba—0.1Ca—0.8Ti—1.4Si—0.6Mn—0.2Ni—0.2Mg—0.1V—O | |
| | | | 0 | 1.1 |
| 20 | 100(Ba$_{0.90}$Ca$_{0.10}$)TiO$_3$ | 1.0098 | 0.95Ba—0.1Ca—0.8Ti—1.4Si—0.04Yb—0.02La—0.02Gd—0.6Mn—0.2Ni—0.5V—0.2Al—O | |
| | | | 0.08 | 1.3 |

TABLE 8-continued

| Sample number | Major component ABO$_3$ | Crystallographic axial ratio c/a of major component ABO$_3$ | Additive component (calcined material) | |
|---|---|---|---|---|
| | | | Component R (mole) | Component M (mole) |
| 21 | 100(Ba$_{0.93}$Ca$_{0.05}$Sr$_{0.02}$)TiO$_3$ | 1.0096 | 0.95Ba—0.1Ca—0.8Ti—1.4Si—0.4Dy—0.2Sm—0.2Ho 0.8 | 0.5Mg—0.3Cr—O 0.8 |
| 22 | 100(Ba$_{0.90}$Ca$_{0.04}$Sr$_{0.01}$)TiO$_3$ | 1.0093 | 0.95Ba—0.1Ca—0.8Ti—1.4Si—0.6Dy—0.3Eu—0.3Er 1.2 | 0.6Mn—0.5Ni—0.5Cr—O 1.6 |
| 23 | 100(Ba$_{0.90}$Ca$_{0.10}$)TiO$_3$ | 1.0101 | 0.95Ba—0.1Ca—1.2Ti—1.8Si—1.0Dy—0.5Ce—0.2Tm 1.7 | 1.0Mn—0.5Ni—0.5Mg—O 2 |
| *24 | 100(Ba$_{0.97}$Ca$_{0.03}$)(Ti$_{0.995}$Zr$_{0.005}$)O$_3$ | 1.0096 | 1.0Ba—0.1Ca—1.2Ti—1.8Si—0.5Sm—0.5Ho—O 1 | 0 |
| 25 | 100(Ba$_{0.97}$Ca$_{0.03}$)(Ti$_{0.995}$Zr$_{0.005}$)O$_3$ | 1.0097 | 1.0Ba—0.1Ca—1.2Ti—1.8Si—0.5Sm—0.5Ho—0.2Pr 1.2 | 0.06Mn—0.02Mo—0.02W—O 0.12 |
| 26 | 100(Ba$_{0.97}$Ca$_{0.02}$Sr$_{0.01}$)TiO$_3$ | 1.0094 | 1.0Ba—0.1Ca—1.2Ti—1.8Si—0.5Yb—0.5Ce—0.5Tb 1.5 | 0.4Mn—0.2Mg—0.2Cu—O 0.8 |
| 27 | 100(Ba$_{0.97}$Ca$_{0.03}$)(Ti$_{0.99}$Hf$_{0.01}$)O$_3$ | 1.0097 | 1.0Ba—0.1Ca—1.2Ti—1.8Si—0.4Y—0.3Nd—0.1Lu 0.8 | 1.0Mn—0.6Co—0.4Fe—O 2 |
| 28 | 100(Ba$_{0.96}$Ca$_{0.03}$Sr$_{0.01}$)TiO$_3$ | 1.0098 | 1.0Ba—0.1Ca—1.2Ti—1.8Si—0.5Y—0.4Gd—0.2Eu 1.1 | 1.0Mn—0.5Ni—0.5Fe—0.2Al—O 2.2 |

As shown in Table 8, the amounts of the components R contained in the additive components in Samples 19 to 23 are increased as the sample number becomes larger. Moreover, the addition amounts of the component M in the additive components are increased in Samples 24 to 28 as the sample number becomes larger.

Table 9 shows the electrical characteristics of monolithic ceramic capacitors produced using the powder dielectric ceramic raw materials having the compositions shown in Table 8, in the same manner as that in Experimental Example 1. The items of the electrical characteristics evaluated and shown in Table 9 are the same as those in Experimental Example 2.

Samples 20 to 23 were compared with each other. In Samples 20 to 22, the concentration of the component R meets the requirement that the concentration of the component R should be in the range of about 0.05 to 1.5 mole based on 100 moles of the major component. The samples 20 to 22 exhibit a higher dielectric constant and a superior temperature characteristic compared to Sample 23 of which the concentration of the component R exceeds about 1.5 moles.

Samples 24 to 28 were compared with each other. the component M is not added to the additive component in Sample 24. Thus, the insulating property can not be ensured for Sample 24. Moreover, the reliability evaluated by the high temperature load service life test is low. Furthermore,

TABLE 9

| Sample number | Dielectric constant | tan δ (%) | Temperature characteristic (ΔC/C$_{20}$) (%) | | Temperature characteristic (ΔC/C$_{25}$) (%) | | High temperature load service life (rejection ratio) | |
|---|---|---|---|---|---|---|---|---|
| | | | −25° C. | 85° C. | −55° C. | 125° C. | 1000 hours | 2000 hours |
| * 19 | 3598 | 8.5 | −2.4 | −0.1 | −5.3 | −19.6 | 43/100 | 98/100 |
| 20 | 3221 | 8.7 | −2.4 | −7.7 | −4.2 | −10.1 | 0/100 | 0/100 |
| 21 | 3162 | 6.8 | −2.5 | −7.6 | −4.9 | −10.4 | 0/100 | 0/100 |
| 22 | 3145 | 7.1 | −3.1 | −9.0 | −4.8 | −12.2 | 0/100 | 0/100 |
| 23 | 2686 | 5.3 | −2.7 | −9.2 | −4.8 | −12.5 | 0/100 | 0/100 |
| * 24 | 3562 | 8.1 | −2.9 | −1.2 | −5.3 | −18.0 | 73/100 | 100/100 |
| 25 | 3485 | 5.7 | −3.2 | −8.2 | −5.1 | −11.7 | 0/100 | 0/100 |
| 26 | 3420 | 5.6 | −3.5 | −8.2 | −4.9 | −12.1 | 0/100 | 0/100 |
| 27 | 3212 | 5.8 | −2.8 | −9.4 | −5.0 | −13.8 | 0/100 | 0/100 |
| 28 | 2640 | 5.5 | −3.3 | −9.5 | −5.2 | −14.1 | 0/100 | 0/100 |

Samples 19 to 23 were compared with each other. First, the component R is not added to the additive component in Sample 19. Accordingly, as seen in Table 9, Sample 19 exhibits a low reliability, as evaluated by the high temperature load service life test, and is inferior in the capacitance—temperature characteristic (ΔC/C$_{25}$) compared to the other samples. On the other hand, Samples 20 to 23 exhibit a high reliability, as evaluated by the high temperature load service life test, and a superior evaluation result with regard to the temperature characteristic.

the temperature characteristic (ΔC/C$_{25}$) is inferior compared with the other samples. On the other hand, Samples 25 to 28 exhibit superior results obtained by the high temperature load service life test and the temperature characteristic test.

Samples 25 to 28 were compared with each other. Samples 25 to 27 in which the concentrations of the components M of the additive components are in the range of about 0.1 to 2 moles based on 100 moles of the major component exhibit a higher dielectric constant and a superior temperature characteristic compared to Sample 28 of which the concentration of the component M exceeds about 2 moles.

What is claimed is:

1. A dielectric ceramic having crystal grains and crystal grain boundaries between the crystal grains comprising:

a perovskite compound having the general formula $ABO_3$, as a major component, in which A represents Ba and Ca, or Ba, Ca and Sr, and B represents Ti, or Ti and at least one of Zr and Hf, and an additive component containing Si, R and M, in which R represents at least one of La, Ce, Pr, Nd, Sm, Eu, Gd, Tb, Dy, Ho, Er, Tm, Yb, Lu and Y, and M represents at least one of Mn, Ni, Co, Fe, Cr, Cu, Mg, Al, V, Mo and W, wherein the additive component is not solid-dissolved and, wherein the major component exists in at least about 90% of the cross-section of at least about 85% by number of all of the crystal grains, and wherein at least Ba, Ca, Ti, Si, R and the M are found at about 85% or more of the analytical points in the crystal grain boundaries.

2. A dielectric ceramic according to claim 1, wherein $Ca_g/Ti_g < Ca_b/Ti_b$, in which $Ca_g$ is the amount of Ca, and $Ti_g$ is the amount of Ti contained in the crystal grains, and $Ca_b$ is the amount of Ca, and $Ti_b$ is the amount of Ti contained in the crystal grain boundaries.

3. A dielectric ceramic according to claim 2, wherein the concentration of Ca in the crystal grains is in the range of about 1 to 20 molar percent based on the amount of the element A in the major component $ABO_3$.

4. A dielectric ceramic according to claim 3, wherein the concentrations on an element basis of the R and the M in the additive component are in the ranges of about 0.05 to 1.5 moles and about 0.1 to 2 moles, respectively, based on 100 moles of the major component.

5. A dielectric ceramic according to claim 4, wherein the perovskite has a crystallographic axial ratio c/a of at least about 1.009.

6. A dielectric ceramic according to claim 1, wherein the concentration of Ca in the crystal grains is in the range of about 1 to 20 molar percent based on the amount of the element A in the major component $ABO_3$.

7. A dielectric ceramic according to claim 1, wherein the concentrations on an element basis of the R and the M in the additive component are in the ranges of about 0.05 to 1.5 moles and about 0.1 to 2 moles, respectively, based on 100 moles of the major component.

8. A dielectric ceramic according to claim 1, wherein the perovskite has a crystallographic axial ratio c/a of at least about 1.009.

9. A method of producing a dielectric ceramic comprising the steps of:

providing a mixture of (a) a perovskite compound having the general formula $ABO_3$ in which A represents Ba and Ca, or Ba, Ca and Sr, and B represents Ti, or Ti and at least one of Zr and Hf, the perovskite compound having a crystallographic axial ratio c/a of at least about 1.009 and (b) a calcined material containing at least Ba, Ca, Ti, Si, R and M, in which R is at least one of La, Ce, Pr, Nd, Sm, Eu, Gd, Tb, Dy, Ho, Er, Tm, Yb, Lu and Y, and M is at least one of Mn, Ni, Co, Fe, Cr, Cu, Mg, Al, V, Mo and W; and firing the mixture of the perovskite compound and the calcined material.

10. A method of producing a dielectric ceramic according to claim 9, wherein the mole ratio Ca/Ti of the perovskite compound is smaller than the mole ratio Ca/Ti in the calcined material.

11. A method of producing a dielectric ceramic according to claim 10, wherein the concentrations on an element basis of the R and the M in the calcined material are in the ranges of about 0.05 to 1.5 moles and about 0.1 to 2 moles, respectively, based on 100 moles of the perovskite.

12. A monolithic ceramic capacitor comprising a laminate which comprises at least three laminated dielectric ceramic layers and at least two internal electrodes extended along different interfaces between dielectric ceramic layers and overlapping each other in the lamination direction; and a pair of external electrodes on outer surfaces of the laminate so as to be electrically connected to different internal electrodes;

wherein the dielectric ceramic layers comprise the dielectric ceramic of claim 5.

13. A monolithic ceramic capacitor according to claim 12, wherein the internal electrodes comprise a base metal.

14. A monolithic ceramic capacitor according to claim 13, wherein the base metal comprises nickel or copper.

15. A monolithic ceramic capacitor according to claim 14, wherein the external electrodes comprise a base metal.

16. A monolithic ceramic capacitor according to claim 13, wherein the external electrodes comprise a base metal.

17. A monolithic ceramic capacitor comprising a laminate which comprises at least three laminated dielectric ceramic layers and at least two internal electrodes extended along different interfaces between dielectric ceramic layers and overlapping each other in the lamination direction; and a pair of external electrodes on outer surfaces of the laminate so as to be electrically connected to different internal electrodes;

wherein the dielectric ceramic layers comprise the dielectric ceramic of claim 1.

18. A monolithic ceramic capacitor according to claim 17, wherein the internal electrodes comprise a base metal.

19. A monolithic ceramic capacitor according to claim 18, wherein the base metal comprises nickel or copper.

20. A monolithic ceramic capacitor comprising a laminate which comprises at least three laminated dielectric ceramic layers and at least two internal electrodes extended along different interfaces between dielectric ceramic layers and overlapping each other in the lamination direction; and a pair of external electrodes on outer surfaces of the laminate so as to be electrically connected to different internal electrodes;

wherein the dielectric ceramic layers comprise the dielectric ceramic of claim 4.

* * * * *

UNITED STATES PATENT AND TRADEMARK OFFICE
CERTIFICATE OF CORRECTION

| | |
|---|---|
| PATENT NO. | : 6,853,536 B2 |
| APPLICATION NO. | : 10/739088 |
| DATED | : February 8, 2005 |
| INVENTOR(S) | : Nakamura et al. |

It is certified that error appears in the above-identified patent and that said Letters Patent is hereby corrected as shown below:

On title page
    In the heading of the patent under: "(*) Notice:", for "This patent is subject to a terminal disclaimer." should read --This patent is not subject to a terminal disclaimer.--.

Signed and Sealed this

Twenty-seventh Day of February, 2007

JON W. DUDAS
*Director of the United States Patent and Trademark Office*